April 28, 1964   G. J. GIBSON   3,131,284
NON-CONSUMABLE ELECTRODE ARC WELDING OF TUBING
Filed Jan. 19, 1962
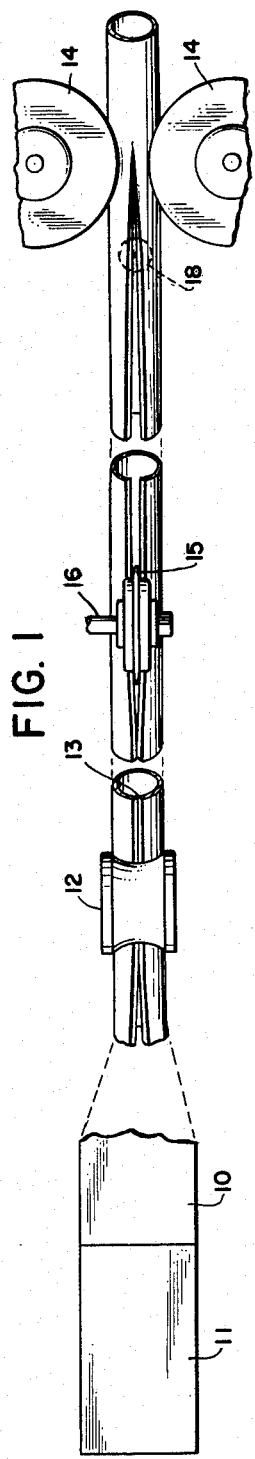
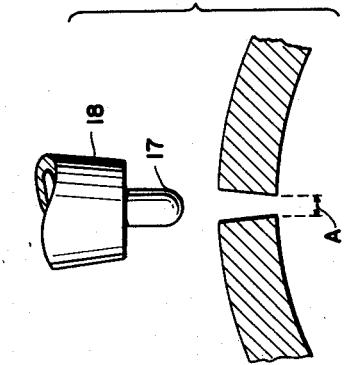
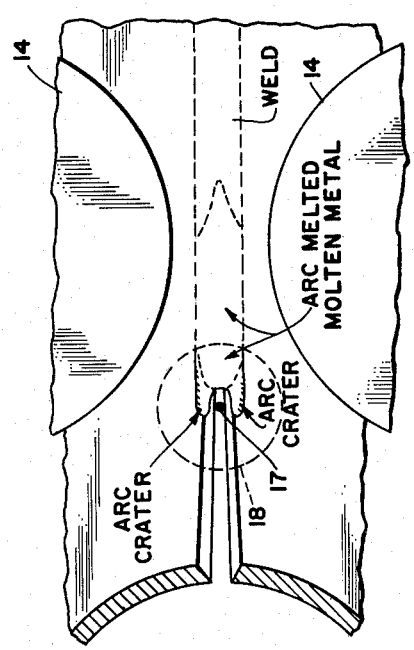
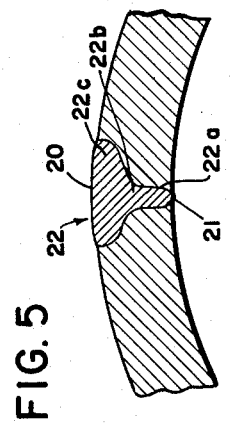

United States Patent Office 3,131,284
Patented Apr. 28, 1964

3,131,284
NON-CONSUMABLE ELECTRODE ARC
WELDING OF TUBING
Glenn J. Gibson, Berkeley Heights, N.J., assignor to The Carpenter Steel Company, Reading, Pa., a corporation of New Jersey
Filed Jan. 19, 1962, Ser. No. 167,307
10 Claims. (Cl. 219—61)

This invention relates to arc welding and more particularly to arc welded tubing as well as an arc welding process and apparatus which is especially well suited for manufacturing such welded tubing from strip.

In the mass production of tubing, such as stainless steel tubing, from strip by means of non-consumable electrode arc welding techniques, considerable success has been achieved in providing welded tubing capable of satisfying the exacting standards of present day requirements. However, conventional arc welding techniques render the process expensive to carry out primarily because of the relatively slow rate at which the work must be fed past the welding electrode.

Hitherto arc welded tubing has generally been made from stainless steel strip by forming a tube from the strip as the latter is fed toward a welding station. This is conventionally done by bringing the opposite longitudinal edges of the strip toward each other. In accordance with one well known, standard practice, the non-consumable welding electrode is positioned so that the tubing being formed passes under the arc with the edges of the seam firmly pressed together and welding is carried out by means of an inert gas shielded arc applied at or immediately before the point where the longitudinal edges of the strip first come together. In practice, when the arc is applied to the closed seam, that is a seam along which the radially inner portions of the abutting edges are in contact, the arc or the plasma generated by the arc cannot directly heat and fuse the edges of the strip and the welding heat must pass down through the thickness of the metal from the outer to the interior surface. In order to obtain high quality welded tubing, the work must remain under the heat of the arc long enough for complete penetration of the heat and fusion of the metal between the opposite surfaces of the tubing. This results in the above-mentioned limitation on the rate of advance of the work relative to the arc such that in a typical product, 1 inch Schedule 40 iron pipe size, formed from A.I.S.I. Alloy Type 304, the welding rate at substantially the maximum tolerable arc current is limited to about 21 inches per minute. The weld bead formed by such a process is characteristically wide, in the circumferential direction, as compared to the thickness of the strip or the tubing formed therefrom. For example, in the case of the aforementioned 1 inch pipe having a wall thickness of .134 inch, the weld bead is usually about ¼ inch wide at the outer surface and about ³⁄₁₆ inch wide at the inner surface of the tubing when formed by conventional processes.

It is to be noted that the smaller the thickness of the tubing being formed, the faster it may be fed past the welding electrode. Thus, with 1 inch Schedule 5 iron pipe, also formed from A.I.S.I. Type 304, having a thickness of .065 inch, the work may be fed at the rate of about 50 inches per minute.

Because of the high cost of manufacturing arc welded tubing as compared to other processes, considerable effort has been expended with a view toward increasing the rate at which the work may be fed past the welding station. One direction which such efforts has taken, has been to utilize a multiplicity of arcs spaced along the path of advance of the work. It has also been proposed to utilize one or more arcs or welding electrodes so directed at the work that the arc of at least one of the electrodes strikes and directly heats the opposed but spaced edges forming the seam to be welded. Such arrangements have failed in practice to provide the desired result.

I have discovered that the primary reason for the unsatisfactory results achieved by the efforts hitherto made to increase the welding rate of such processes has been the failure to appreciate the critically important role played by that portion of the work which is directly fused or melted by the heat of the arc. My present invention stems from the discovery that under certain conditions which must be carefully controlled, the molten metal formed by the welding arc acts to transfer sufficient heat to the radially innermost portions of the opposed edges forming the seam to heat the same to the required welding temperature in much less time than hitherto required. From experiments, I have determined that of all the interacting factors affecting the welding process, it is the space between the opposed edges forming the seam which must be most critically controlled if the molten metal, directly fused by the arc, is to be effective in making high quality welds at speeds far greater than hitherto attainable.

It is, therefore, a principal object of the present invention to provide an improved arc welding process for forming tubing from strip by means of which welded tubing of a given size may be formed at approximately twice the speed or faster than could hitherto be done.

Another object of this invention is to provide an improved apparatus which is especially well suited for forming non-consumable electrode arc welded tubing at high speed having a weld which is free from objectionable shrinkage or porosity.

A further object of this invention is to provide improved metal tubing having a longitudinal seam welded at high speed by the arc from a non-consumable electrode and which is free from objectionable shrinkage or porosity along the weld.

Further objects as well as advantages of the present invention will be apparent from the following description and the accompanying drawings, in which:

FIGURE 1 is a diagrammatic plan view of apparatus for carrying out the process of the present invention;

FIGURE 2 is a sectional view through the partially completed tubing, the tubing being shown in its condition as it leaves the forming rolls 12 of FIGURE 1;

FIGURE 3 is an enlarged diagrammatic plan view of a portion of the tubing as it passes under the welding electrode and then between the squeeze rolls 14;

FIGURE 4 is an enlarged fragmentary sectional view showing the opening in the seam of the tubing directly under the welding electrode in the absence of the welding current; and FIGURE 5 is an enlarged cross sectional view of the welded tubing showing the weld bead.

It has been shown that the heat of the arc in the non-consumable electrode arc welding process is distributed between the electrode, the arc plasma, and the work piece being welded. For example, when an inert gas shielded tungsten electrode is connected to function as the cathode and is energized by direct current, the total heat made available by the arc is divided so that about 80% goes to the work piece. The temperature of the arc is of the order of about 15,000° Kelvin. At such high temperatures, the metal fused by the arc is extremely fluid and even the slight pressure exerted by the electrical forces in the arc plasma cause the superheated metal to flow rapidly in a thin film away from the area under the electrode to form the well known weld crater.

In practice, the electrode is held stationary and the work is advanced toward the electrode but with regard to the apparent direction of advance of the electrode relative to the work, the molten metal fused directly by the heat of the arc is forced backward along the seam away from the arc to form a pool of molten metal. With the electrode continuously advancing relative to the work, the pool of molten metal is seen to advance behind the electrode and is maintained by the thin film of molten metal displaced at relatively high speed by the arc from the crater being formed under the electrode.

In the welding processes hitherto practiced, penetration of the weld through the entire thickness of the work piece resulted from the transfer of heat from the superheated molten metal down through the underlying initially solid metal. This penetration of the heat from the arc melted molten metal down through the thickness of the work piece must be complete if a satisfactory weld is to be achieved. The time and heat requirements for complete penetration to take place are so interrelated that if the rate at which the work is fed past the electrode is increased to any appreciable extent and, though the maximum tolerable current be utilized in the arc for the purpose of generating the maximum amount of heat in the work piece, penetration will not be achieved and the weld produced will be unsatisfactory. Because such welds are formed by the penetration of the welding heat through the thickness of the work, the interior portion of the weld bead is relatively wide and extends in the form of a projecting bead into the interior of the formed tubing. The limits separating good welding practices from bad practices are extremely narrow, particularly with regard to the optimum rate at which the work may be fed.

I have found that unique results are achieved when the thin superheated fast moving film of molten metal displaced from the crater directly under the arc is caused to flow down into the seam being welded rather than only back over the exterior surface of the metal adjacent to the seam. In the welding process of the present invention, the superheated molten metal is caused to flow completely over the opposed seam surfaces just before these surfaces are brought together to form the welded seam. In this way, heat from the arc melted molten metal is transferred directly to and fuses the surfaces to be welded together instead of having to penetrate through the thickness of the metal. Because the end surfaces to be butt welded are thus directly heated, much less time than heretofore is required to bring the metal to welding temperature, thereby making possible greatly accelerated feed rates which are two times or more faster than hitherto possible.

In order to practice the present invention, it is essential that the edge surfaces forming the seam to be welded under and adjacent to the arc be far enough apart so that the arc melded molten metal displaced from the arc crater flows completely over the entire extent of these surfaces between the interior and exterior surfaces of the tubing. The opposed seam surfaces approach each other closest at the interior surface of the tubing and at this point the space between them must be large enough to permit complete penetration of the molten metal. If the opening is too great, the metal will flow out of the joint and will not perform the desired function. The optimum spacing is related to the surface tension of the molten metal which is in turn dependent upon the temperature of the molten metal which reaches the bottom of the opening. This opening or spacing should be no greater than that spacing at which the surface tension of the molten metal will permit it to support itself in the opening without dropping through. In practice, it has been found that when the seam surfaces at their closest approach to each other under the arc are 1/16, that is about 0.062 of an inch, or more apart then an effective weld cannot be formed. Preferably, the distance between the juxtaposed surfaces to be butt welded in forming the seam is carefully maintained between about 0.035 inch and 0.050 inch at the point of their closest approach toward each other at the interior surface of the tubing being welded. If this opening in the seam being welded is less than about 0.030 inch, then the arc melted molten metal does not flow completely down into the opening and the innermost portion of the seam remains unwelded when the high feed rates made possible by the present invention are utilized. In the preferred critical range stated of an opening of from about 0.035 to 0.050 inch, successful high speed welding is accomplished in accordance with the present invention.

While the following three examples of welded seam tubing formed in accordance with the present invention involve the formation of the tubing from stainless steel, it is to be understood that the present invention is also applicable to the manufacture of welded seam tubing by means of a nonconsumable electrode inert gas shielded arc from such other weldable materials as nickel base alloys, the A.I.S.I. Stainless 400 series of alloys commonly referred to as stainless iron, as well as tubing formed from aluminum, copper and copper alloys.

The process of the present invention may be readily utilized in the welding of the seam in tubing which is formed by the use of conventional apparatus. The tubing forming the examples discussed hereinafter in detail was formed and welded on an apparatus now to be described in connection with FIGURE 1.

A strip 10 of the desired composition is conveniently drawn from a coil 11 and fed through a series of forming dies or rolls only the last set of which is indicated at 12. As the materail leaves the rolls 12, it is in the form of a closed tube having an unwelded seam 13 which, as shown in FIGURE 2, is V-shaped. It is to be noted that under rolls 12 the seam 13 is closed at the apex 13a of the V which is at the inner end of the seam.

From the rolls 12, the strip which has been formed into a tube is drawn through a pair of squeeze rolls 14 mounted for rotation about vertical axes on opposite sides of the feed path, the seam being vertically disposed at the top of the tube. Preferably, the squeeze rolls 14 are mounted so as to facilitate ready adjustment of the distance between the rolls 14 and the pressure applied thereby to the tubing. A circular disk 15, which functions as a separator, is rotatably mounted over the feed path on a spindle 16 between the rolls 12 and the rolls 14 so that the tapered edge of the separator 15 is forced into the seam. The separator 15 may have a thickness of about 3/8 of an inch, so as to force the opposed edges of the seam apart a corresponding amount at their closest approach.

With squeeze rolls 14 adjusted to bring the fused metal of the seam into the proper shape for a good weld, the unwelded seam as viewed from above (FIGURE 1) in the absence of an arc is in the form of an elongated V with the opposite surfaces of the seam coming together under pressure at the pinch line of the squeeze rolls 14. A conventional nonconsumable electrode 17 together with a nozzle 18 for providing an inert gas shield is mounted over the open seam at a point where the opening at the bottom of the open seam as indicated at A in FIGURE 4 is not less than 0.030 inch and not more than 1/16 of an inch but preferably is about 0.035 to about 0.050 inch. In establishing the critical conditions required for making welds at high speed in accordance with the present invention, the electrode is preferably located about 0.750 inch to 1.0 inch from the pinch line or axis of the squeeze rolls 14. Also, the V-shaped opening or angle formed by the seam as viewed from above in FIGURE 1 measures about 2.5° to 3.5°. In practice, the electrode 17 may be a conventional thoriated tungsten electrode fitted with a gas delivery nozzle 18. Preferably, an inert gas is also flowed against the interior surface of the seam being welded to ensure that the molten metal at the interior of the weld is also protected against the formation of oxides.

An inert gas shield which provides excellent results and which was used in making the tubing of the following examples consists of a monatomiac gas mixture of helium and argon fed at the rate of about 25 cubic feet per hour helium and 2 cubic feet per hour argon through nozzle 18 having an orifice ½ inch in diameter. A flow of nitrogen ($N_2$) was fed along the interior of the weld at the rate of about 7 cubic feet per hour.

*Example I*

A strip of stainless steel was formed from an ingot having the composition of A.I.S.I. Alloy Type 304 which had been arc melted in the conventional way. The strip was formed by conventional metal working practices including hot rolling, pickling, and cold rolling, followed by annealing and such surface cleaning as was necessary and then slit into strip of the desired width by a rotary slitter so as to ensure uniformity of its edges and width. The strip was formed to have a thickness of 0.065 inch and a width suitable for forming standard tubing having an outside diameter of 1 5/16 inch, the standard for 1 inch pipe size.

The thus-formed strip was passed through the apparatus of FIGURE 1 at a rate of 125 inches per minute. A welding current of 225 amperes was used with an arc voltage of 15 volts. The seam opening at A directly under the welding electrode was 0.030 inch and the distance between the welding electrode 17 and the pinch line of the squeeze rolls 14 was 0.875 inch. Under these conditions the weld formed in the seam of the tubing was free of defects and suitable for use without swaging or drawing. This constitutes an improvement in the rate of feed of the work of about 250% as compared to conventional practices for forming tubing of comparable thickness.

*Example II*

Stainless steel strip was formed of A.I.S.I. Type 304 as was described in connection with Example I except that the thickness of the strip was 0.109 inch. This strip was passed through the apparatus of FIGURE 1 as was described in connection with Example I except that the welding current was maintained at 250 amperes, the rate of feed was 65 inches per minute, the seam opening under the electrode as measured at A was 0.035 inch and the distance between the electrode 17 and the pinch line of the squeeze rolls 14 was 1.0 inch. The weld obtained was free of defects. This represents an improvement in the rate of feed of the work of about 250% as compared to conventional practices for forming tubing of comparable wall thickness.

*Example III*

Stainless steel strip was formed of A.I.S.I. Type 304 as was described in connection with Example I except that the thickness of the strip was 0.130 inch. This strip was passed through the apparatus of FIGURE 1 as was described in connection with Example I except that the welding current was maintained at 275 amperes, the strip was fed at a rate of 45 inches per minute, the seam opening under the electrode as measured at A was 0.037 inch and the distance between the electrode 17 and the pinch line of the rolls 14 was 0.750 inch. The resulting weld was without defect. In forming tubing of this thickness, the present invention provides an improvement of somewhat more than twice the feed rate obtainable with conventional practices.

In each of the Examples I, II and III, the arc and the weld was shielded by means of an inert gaseous atmosphere formed as described hereinabove. In each instance, the coil 11 was made up of a 200 foot length of strip which was converted into tubing and cut into convenient lengths of 20 feet as the tubing was progressively fed from the apparatus.

In tubing formed in accordance with the present invention, the weld bead has the characteristic configuration shown in FIGURE 5. Such tubing is free of weld defects and is free of objectionable porosity and shrinkage along the center line of the weld. The interior and exterior surfaces 20, 21 of the weld bead 22 are shown in FIGURE 5 in their as welded condition, finishing treatments being neither required or used. Because the portion 22a of the weld bead adjacent to its surface 21 is formed from metal fused by the heat received directly from the arc melted metal rather than down through the thickness of the metal, this radially inner portion 22a of the weld bead is substantially thinner than the wall thickness of the tubing and merges with the radially outer portion 22c of the weld bead through an intermediate portion 22b having concave sides. The shape of the intermediate portion 22b reflects the rate and extent of heat penetration downward from the exterior surface as compared to the rate and extent of heat penetration laterally from the seam edges. The thin inner portion 22a of the weld bead is of substantially uniform thickness with the result that the radially extending sides thereof are substantially parallel. As shown in FIGURE 5, the radially inner, outer and intermediate portions of the weld bead each forms about ⅓ of the extent of the weld bead as measured in the radial direction.

The welds formed in Examples I, II and III each had the configuration shown in FIGURE 5. With the larger tolerable seam openings, that is when the seam opening under the welding electrode is greater than 0.050 inch but less than 0.062 inch, the inner portion of the weld bead tends to project farther into the tubing than shown in FIGURE 5. This may be tolerated in some instances or the projecting metal may be removed.

As has been pointed out hereinabove, the seam opening under the welding electrode must be carefully maintained within the limits stated if satisfactory results are to be achieved. In the case of Example I, a reduction of the seam opening of as little as 0.005 inch to provide an opening at A in FIGURE 4 of 0.025 inch resulted in the inner, thin portion of the weld bead having less thickness than required for a sound weld. In the case of Example II, a reduction of the seam opening to 0.020 inch resulted in an unsatisfactory weld because of failure of the weld to penetrate completely through from the outside to the inside surface of the work. In the case of Example III, a reduction of the seam opening to 0.027 inch resulted in the inner portion of the weld bead being excessively thin.

Such conventional practices as the application of a magnetic field to the arc, preheating of the edges which form the seam to be welded as well as others may be utilized in practicing the present invention, if desired.

The terms and expressions which have been employed are used as terms of description and not of limitation, and there is no intention, in the use of such terms and expressions of excluding any equivalents of the features shown and described or portions thereof, but it is recognized that various modifications are possible within the scope of the invention claimed.

I claim:
1. The method of welding metal tubing formed with a longitudinally extending seam, comprising:
 (a) feeding said tubing past a non-consumable welding electrode arc with the edges of the seam to be welded substantially vertically disposed below the electrode,
 (b) maintaining the edges of said seam at their closest approach to each other at their radially inner ends under the arc at a distance from each other to there form a gap such that arc melted molten metal formed from said tubing adjacent the radially outer extremity of said seam flows down into the seam over the opposite edges thereof to the radially inner ends of said edges with the molten metal bridging and supporting itself in said gap by its surface tension,
 (c) maintaining the current and voltage of the arc and the rate of feed of the tubing past the arc at values such that when the seam edges are squeezed together at a point beyond said arc a weld is thereafter formed completely down through said seam between its radially outer and inner ends, and (d) squeezing the edges of said seam together at said point to form said weld.

2. The method of welding metal tubing formed with a longitudinally extending seam, comprising:

(a) feeding said tubing past a non-consumable welding electrode arc with the edges of the seam to be welded substantially vertically disposed below the electrode, (b) maintaining the edges of said seam at their closest approach to each other under the arc between about 0.030 inch and 0.062 inch so that arc melted molten metal formed from said tubing adjacent the radially outer extremity of said seam flows down into the seam over the opposite edges thereof to the radially inner ends of said edges with the melten metal bridging and supporting itself in said gap by its surface tension, (c) maintaining the current and voltage of the arc and the rate of feed of the tubing past the arc at values such that when the seam edges are squeezed together at a point beyond said arc a weld is thereafter formed completely down through said seam between its radially outer and inner ends, and (d) squeezing the edges of said seam together at said point to form said weld.

3. The method of welding metal tubing formed with a longitudinally extending seam, comprising:

(a) feeding said tubing past a non-consumable welding electrode arc with the edges of the seam to be welded substantially vertically disposed below the electrode, (b) maintaining the edges of said seam at their closest approach to each other under the arc between about 0.035 and 0.050 inch so that arc melted molten metal formed from said tubing adjacent the radially outer extremity of said seam flows down into the seam over the opposite edges thereof to the radially inner ends of said edges with the molten metal bridging and supporting itself in said gap by its surface tension, (c) maintaining the current and voltage of the arc and the rate of feed of the tubing past the arc at values such that when the seam edges are squeezed together at a point beyond said arc a weld is thereafter formed completely down through said seam between its radially outer and inner ends, and (d) squeezing the edges of said seam together at said point to form said weld.

4. The method of welding metal tubing formed with a longitudinally extending seam, comprising:

(a) forming, from a flat strip, closed tubing with a longitudinally extending seam having its radially innermost edges in substantially abutting relation, (b) spreading said seam edges apart and feeding said tubing past a non-consumable welding electrode arc with the edges of the seam substantially vertically disposed below the electrode, (c) maintaining the edges of said seam at their closest approach to each other at their radially inner ends under the arc at a distance from each other to there form a gap such that arc melted molten metal formed from said tubing adjacent the radially outer extremity of said seam flows down into the seam over the opposite edges thereof to the radially inner ends of said edges with the molten metal bridging and supporting itself in said gap by its surface tension, (d) maintaining the current and voltage of the arc and the rate of feed of the tubing past the arc at values such that when the seam edges are squeezed together at a point beyond said arc a weld is thereafter formed completely down through said seam between its radially outer and inner ends, and (e) squeezing the edges of said seam together at said point to form said weld.

5. The method of welding metal tubing formed with a longitudinally extending seam, comprising:

(a) forming, from a flat strip, closed tubing with a longitudinally extending seam having its radially innermost edges in substantially abutting relation, (b) spreading said seam edges apart and feeding said tubing past a non-consumable welding electrode arc with the edges of the seam substantially vertically disposed below the electrode, (c) maintaining the edges of said seam at their closest approach to each other under the arc between about 0.030 inch and 0.062 inch so that arc melted molten metal formed from said tubing adjacent the radially outer extremity of said seam flows down into the seam over the opposite edges thereof to the radially inner ends of said edges with the molten metal bridging and supporting itself in said gap by its surface tension, (d) maintaining the current and voltage of the arc and the rate of feed of the tubing past the arc at values such that when the seam edges are squeezed together at a point beyond said arc a weld is thereafter formed completely down through said seam between its radially outer and inner ends, and (e) squeezing the edges of said seam together at said point to form said weld.

6. The method of welding metal tubing formed with a longitudinally extending seam, comprising:

(a) forming, from a flat strip, closed tubing with a longitudinally extending seam having its radially innermost edges in substantially abutting relation, (b) spreading said seam edges apart and feeding said tubing past a non-consumable welding electrode arc with the edges of the seam substantially vertically disposed below the electrode, (c) maintaining the edges of said seam at their closest approach to each other under the arc between about 0.035 and 0.050 inch so that arc melted molten metal formed from said tubing adjacent the radially outer extremity of said seam flows down into the seam over the opposite edges thereof to the radially inner ends of said edges with the molten metal bridging and supporting itself in said gap by its surface tension, (d) maintaining the current and voltage of the arc and the rate of feed of the tubing past the arc at values such that when the seam edges are squeezed together at a point beyond said arc a weld is thereafter formed completely down through said seam between its radially outer and inner ends, and (e) squeezing the edges of said seam together at said point to form said weld.

7. In an apparatus for welding metal tubing having a longitudinally extending seam:

(a) first means for forming tubing having a closed seam from flat strip, arc welding means including a non-consumable welding electrode and a pair of coacting squeeze rolls all mounted in that sequence along a feed path, (b) said electrode being positioned above said feed path and spaced from said squeeze rolls on the side thereof toward said first means, (c) spreader means along said path between said first means and said electrode for engaging the edges of said seam and spreading the same apart a distance such that the gap formed between said edges at their closest approach to each other under said electrode is such that arc melted molten metal is self-supporting in said gap, and (d) means for feeding said strip and the tubing formed therefrom along said path from said first means past said spreader means, said electrode and through said squeeze rolls.

8. In an apparatus for welding metal tubing having a longitudinally extending seam:
   (a) first means for forming tubing having a closed seam from flat strip, arc welding means including a non-consumable welding electrode and a pair of coacting squeeze rolls all mounted in that sequence along a feed path,
   (b) said electrode being positioned above said feed path and spaced from said squeeze rolls on the side thereof toward said first means,
   (c) spreader means along said path between said first means and said electrode for engaging the edges of said seam and spreading the same apart a distance such that the gap formed between said edges at their closest approach to each other under said electrode is between about 0.030 inch and 0.062 inch, and
   (d) means for feeding said strip and the tubing formed therefrom along said path from said first means past said spreader means, said electrode and through said squeeze rolls.

9. In an apparatus for welding metal tubing having a longitudinally extending seam:
   (a) first means for forming tubing having a closed seam from flat strip, arc welding means including a non-consumable welding electrode and a pair of coacting squeeze rolls all mounted in that sequence along a feed path,
   (b) said electrode being positioned above said feed path and spaced from said squeeze rolls on the side thereof toward said first means,
   (c) spreader means along said path between said first means and said electrode for engaging the edges of said seam and spreading the same apart a distance such that the gap formed between said edges at their closest approach to each other under said electrode is between about 0.035 inch and 0.050 inch, and
   (d) means for feeding said strip and the tubing formed therefrom along said path from said first means past said spreader means, said electrode and through said squeeze rolls.

10. Metal tubing formed from strip by means of a longitudinally extending weld bead formed by a non-consumable electrode arc and joining the opposite longitudinal edges of said strip in a butt weld:
   (a) said weld bead in cross section transverse to the axis of said tubing having radially inner and outer portions joined by an intermediate portion,
   (b) said radially inner portion having substantially less width than the wall thickness of said tubing and having substantially uniform width from where it merges with the interior surface of said tubing to where it merges with the intermediate portion of said weld bead,
   (c) said radially outer weld bead portion where it merges with the outer surface of said tubing having a width which is greater than the wall thickness of said tubing, and
   (d) the intermediate portion of said weld bead joining said radially inner and outer portions having concave sides.

References Cited in the file of this patent

UNITED STATES PATENTS

| | | |
|---|---|---|
| 2,061,671 | Riemenschneider | Nov. 24, 1936 |
| 2,160,586 | Gettig et al. | May 30, 1939 |
| 2,716,691 | Bowman | Aug. 30, 1955 |
| 2,844,705 | Bowman et al. | July 22, 1958 |